No. 823,132. PATENTED JUNE 12, 1906.
A. R. MARET.
COTTON CHOPPER.
APPLICATION FILED JUNE 20, 1905.

2 SHEETS—SHEET 1.

Witnesses
G. R. Thomas
E. M. Colford

Inventor
Adela R. Maret
By Chandler & Chandler
Attorneys

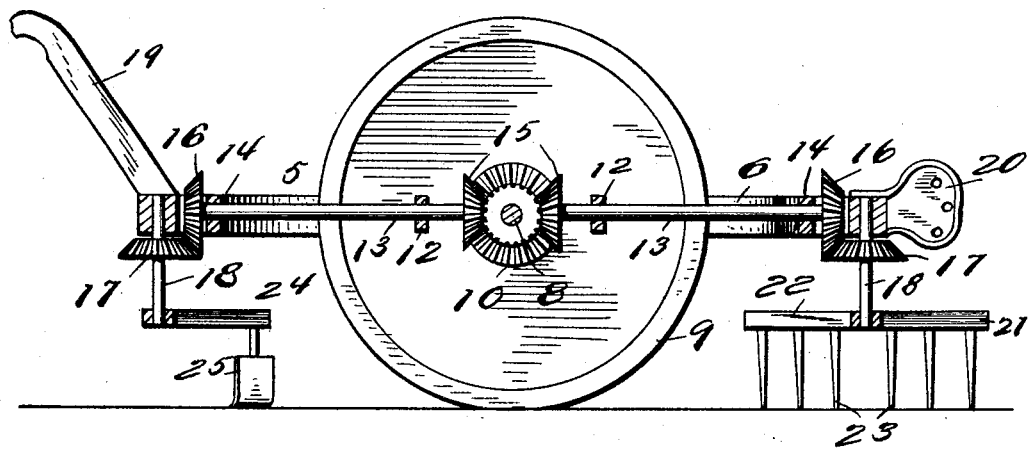
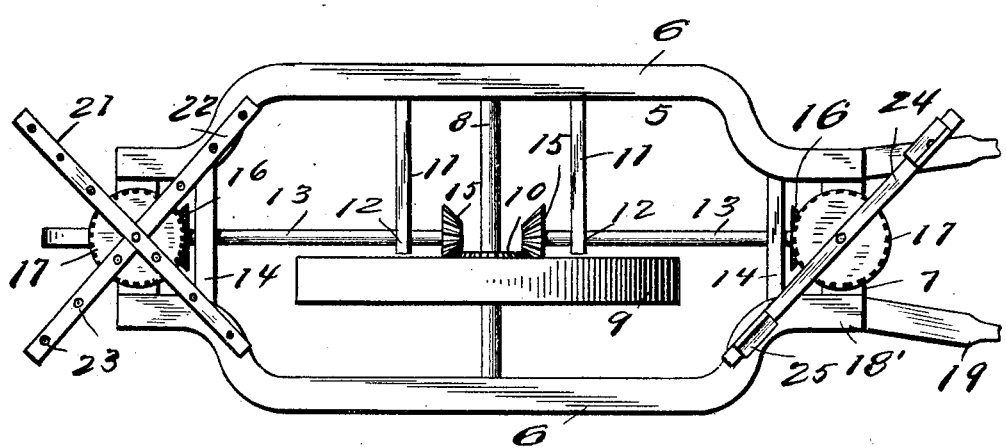

UNITED STATES PATENT OFFICE.

ADELA R. MARET, OF LAVONIA, GEORGIA.

COTTON-CHOPPER.

No. 823,132.

Specification of Letters Patent.

Patented June 12, 1906.

Application filed June 20, 1905. Serial No. 266,091.

*To all whom it may concern:*

Be it known that I, ADELA R. MARET, a citizen of the United States, residing at Lavonia, in the county of Franklin, State of Georgia, have invented certain new and useful Improvements in Cotton-Choppers; and I do hereby declare the following to be a full, clear, and exact description of the invention, such as will enable others skilled in the art to which it appertains to make and use the same.

This invention relates to farm implements, and more particularly to implements for use in the culture of cotton, and has for its object to provide an implement of this kind which will operate to thin and chop cotton in the field and which will be extremely simple, thus being produceable at a low figure.

Other objects and advantages will be apparent from the following specification, which describes an embodiment of the present invention.

Figure 1:
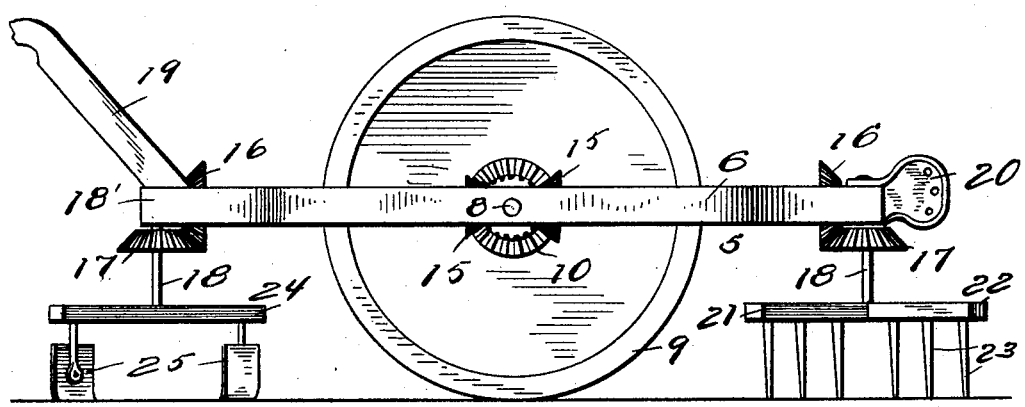
Figure 2:
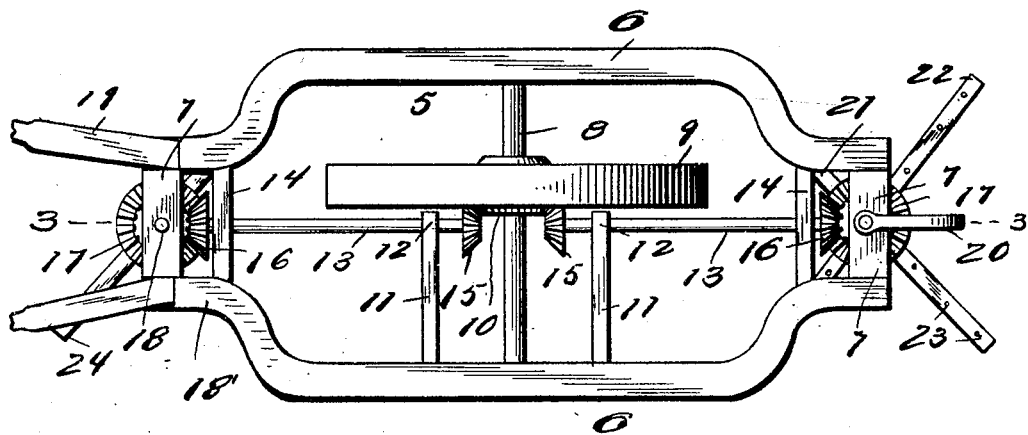

In the drawings forming a portion of this specification, and in which like numerals of reference indicate similar parts in the several views, Figure 1 is a side elevation of the present implement. Fig. 2 is a top plan view. Fig. 3 is a section on line 3 3 of Fig. 2. Fig. 4 is a bottom plan view.

Referring now to the drawings, the present invention comprises a frame 5, including longitudinally-extending side sills 6, the end portions of which are offset inwardly, and the two sills are connected at their extremities by end members 7. A central transversely-extending axle 8 is mounted at its end in the sills and carries a revoluble ground-wheel 9, having a bevel-gear 10 secured thereto. Shaft-supporting arms 11 extend inwardly from one of the sills 6 and have bearings 12 at their inner ends, in which are journaled longitudinally-extending alining-shafts 13, which are journaled adjacent to their outer ends in transverse members 14, secured to the offset portions of the sills. The inner ends of the shafts 13 carry bevel-gears 15, meshing with the bevel-gear 10, and the outer ends of the shaft 13 carry bevel-gears 16, which mesh with similar gears 17, carried by vertical shafts 18, which are journaled in the end members 7. The frame has a rearward end 18′, to which are secured guiding-handles 19, and a clevis 20 is carried by the forward end of the frame.

The forward vertical shaft 18 carries crossed horizontally-extending arms 21 and 22 at its lower ends, and these arms are provided with depending teeth 23. The rearward shaft 18 carries a horizontally-extending arm 24, which is mounted at its center upon the shaft, and this arm is provided with oppositely-directed horizontally-extending cutting-blades 25 at its opposite end. It will thus be seen that as the implement is moved over the ground the shafts 18 will be revolved to revolve the arms connected therewith and that the implement may be moved to bring the teeth 23 and blades 25 into position to treat the stalks of cotton or plants of a similar nature.

What is claimed is—

1. In an implement of the class described, the combination with a frame including parallel sills having their end portions inwardly offset, of connecting members secured to the ends of the sills, vertical shafts journaled in the connecting members, inwardly-extending members carried by one of the sills between its offset portions and lying in spaced relation, transverse members secured to the sills and extending between their offset portions inwardly of the connecting members, longitudinal shafts journaled in the inwardly-extending members and in the transverse members, said shafts lying in spaced relation at their inner ends, gear connections between the outer ends of the horizontal shafts and the vertical shafts, devices carried by the lower ends of the vertical shafts, a transverse shaft journaled in the sills between the horizontal shafts, gear connections between the transverse shaft and the horizontal shafts, and a ground-wheel fixed upon the horizontal shaft and lying between the sills.

2. In an implement of the class described, the combination with a frame including parallel sills, of connecting members secured to the ends of the sills, transverse members secured to the sills adjacent to their ends and inwardly of the connecting members, inwardly-extending members carried by one of the sills between the transverse members and lying in spaced relation, horizontal longitudinal shafts journaled in the transverse members and in the inwardly-extending members and lying in spaced relation at their inner ends, vertical shafts journaled in the connecting members, plant and ground treating devices carried by the lower ends of the vertical shafts respectively, gear connections between the vertical and horizontal shafts, a transverse shaft journaled in the sills and extending between the horizontal shafts, gear connections between the transverse and horizontal shafts, and a ground-wheel fixed upon the transverse shaft and lying between the sills.

In testimony whereof I affix my signature in presence of two witnesses.

ADELA R. MARET.

Witnesses:
R. P. ROBERTSON,
J. W. MARET.